Figure 1:
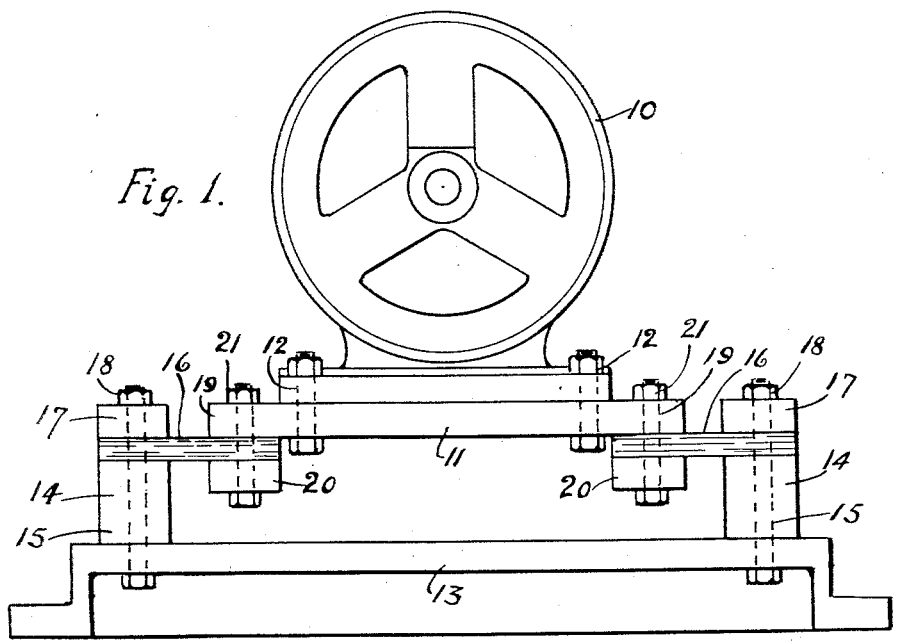

J. G. RIMMER.
VIBRATION ABSORBING MOTOR STAND.
APPLICATION FILED MAY 7, 1913.

1,165,288. Patented Dec. 21, 1915.

WITNESSES:

INVENTOR
James G. Rimmer.
BY Clyde L. Rogers
HIS ATTORNEY.

UNITED STATES PATENT OFFICE.

JAMES G. RIMMER, OF DORCHESTER, MASSACHUSETTS.

VIBRATION-ABSORBING MOTOR-STAND.

1,165,288.  Specification of Letters Patent.  Patented Dec. 21, 1915.

Application filed May 7, 1913. Serial No. 766,030.

*To all whom it may concern:*

Be it known that I, JAMES G. RIMMER, a subject of the King of Great Britain, and resident of Dorchester, county of Suffolk, State of Massachusetts, have invented an Improvement in Vibration-Absorbing Motor-Stands, of which the following description, in connection with the accompanying drawings, is a specification, like characters on the drawings representing like parts.

The conversion of alternating current electric energy as commonly supplied for commercial purposes, into motive power particularly in small units, has hitherto been subject to a serious objection in places where quietness of operation is essential for the reason that alternating current motors are subject to intense, internal magnetically induced vibrations of short amplitude and high frequency causing a humming or buzzing which is transmitted to, and intensified by, the base on which the motor is mounted provided the motor be fastened to the base so as to be in any wise solid and secure. It has been proposed to interpose felt or rubber pads between the motor and its base to lessen the objectionable noise thus created but so far as I am aware these pads have been interposed directly between the motor and base and in position to be compressed as the motor is screwed tight to the base so that the noise dampening property of the pad is largely diminished.

A prime object of the present invention is to provide a motor mounting wherein flexible pieces are interposed to support the motor on its base securely and firmly, and with the flexible vibration absorbing pieces interposed between the motor and base in a manner so that these vibration absorbing pieces are not compressed in use but hold the motor in suspension with a stretching or tension tendency instead, whereby the maximum of vibration absorbing property is constantly attained, so that the magnetically induced vibration imparted to the base and to other objects in the vicinity is practically *nil.* I have found even when vibration absorbing pads are interposed between the motor and its stand, in a manner so that such pads or pieces are compressed, there is still a considerable transmission of the objectionable magnetically induced vibration of short amplitude and high frequency, with a resulting humming. So far as I am aware, however, it has heretofore been considered necessary for holding a motor in substantially fixed and rigid position so as to be capable of transmitting power by belt or like gear transmission, to have such flexible vibration absorbing pads or pieces interposed between the motor and its stand in a way so that they are compressed and hence less effective for the desired purpose. I have found that by mounting the motor on its stand with a plurality of interposed vibration absorbing strips or pieces mutually opposed and held under tension in a manner so as to thereby hold the motor substantially fixed and rigid, I am enabled to attain the two-fold beneficial results of keeping the interposed strips constantly under tension and hence most effective for insulating and dampening the magnetically induced vibration, and at the same time the opposite pull of the oppositely disposed holding strips holds the motor secure and substantially immovable so that power can be transmitted therefrom by usual gearing connections for any desired purpose such as operating an organ blower for which the device is well adapted on account of the absence of humming and buzzing.

The salient characteristics of the invention will be better understood from the following detailed description taken in connection with the accompanying drawings wherein an illustrative embodiment of the invention is shown and will be thereafter pointed out in the appended claims.

Figure 2:
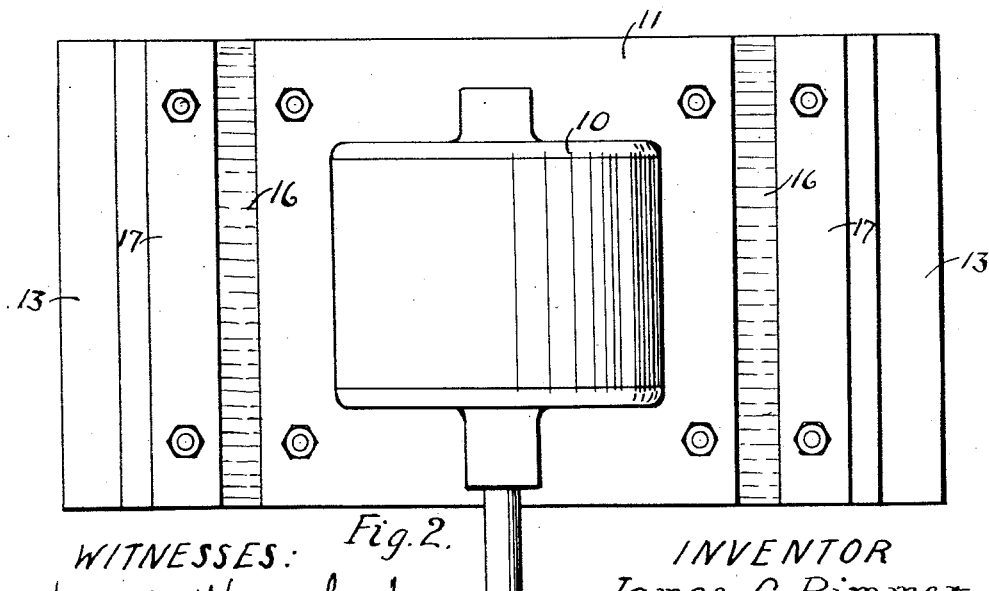

Referring to the drawings: Figure 1 is a side elevation of the motor mounted in a base support in accordance with my invention; and Fig. 2 is a plan view thereof.

An alternating current motor of any usual or suitable type is indicated conventionally at 10, the bottom plate 11 of the motor being secured to the casting of the motor proper as by clamp bolts 12 in usual manner.

The motor stand or base is indicated at 13 and may be of any usual or appropriate form. Spacing blocks 14 are mounted at opposite sides of this base being held in position by bolts 15 passing therethrough and through the base 13. These bolts extend above the tops of the spacing blocks 14 and are adapted to clamp down on to the tops of said blocks, flexible strips or pieces 16 which extend inward some little distance from the blocks 14 as shown. These flexible pieces are held firmly clamped to the top of the blocks 14 by presser plates 17 resting on the tops thereof, these plates being acted on by the nuts 18 threaded on the tops of bolts 15 and thus the flexible pieces 16 are held rigidly assembled with the base, and with their inner sides free and spaced some little distance above the base 13. To these free sides of the flexible pieces 16 the bottom plate 11 of the motor is clamped by means of bolts 19 and clamp plates 20, these bolts being drawn up for clamping action by their nuts 21 in a manner at once understood.

The flexible strips or pieces 16 may be of rubber or any other suitable vibration absorbing material and in practice these are made of the proper thickness and texture to hold the motor suspended and substantially immovable in its operative action with the power transmission belt engaged therewith. It will be understood that the device may be set in any convenient position or at any angle, and that under certain conditions the flexible tension action of the pieces 16 may be utilized to act as a constant belt tension adjuster, this being readily practicable owing to the elasticity of the rubber if rubber pieces be used.

It is to be understood that by the present invention I especially aim to insulate the motor from its base so as to eliminate the short-amplitude, magnetically induced vibrations as distinguished from the slower mechanical vibrations, and where I refer to vibration absorbing means in the present description and claims I mean such provision, illustratively shown as the rubber strips 16, as is adapted for this purpose; i. e., while interposed metallic springs would be adapted to dampen and lessen the slower mechanical vibrations, such springs would be practically useless for the present purpose, since their spring action is entirely too slow for absorbing the high frequency magnetic vibrations.

While having many other and more general fields of usefulness such as in adding machines, cash carrying machines and the many other places where insulation from magnetically induced vibration is desirable, the invention finds a peculiar and particularly important utility in connection with musical instruments such as organs and piano players. With these instruments, while it is essential that the motor be mounted inside of or closely adjacent the instrument, this has hitherto been impracticable for the reason that the magnetically induced vibrations of the motor as to amplitude and frequency, are within the sounding range of the instrument so that the instrument is caused to set up sympathetic vibrations in unison with those of the motor, intensifying the hum of the motor to an extent precluding its use in such connection. I have found that with the use of my invention the motor can be housed within the instrument casing and the magnetically induced vibration eliminated so that its effects are quite unnoticeable. The invention is also useful in connection with generators and rotary transformers, the term motor being used herein in an illustrative and not a restrictive sense; I therefore do not desire to be limited to any particular form, nor do I desire to be limited to the specific details of construction shown, and I hence refer to the appended claims rather than to the foregoing description to indicate the scope of protection intended to be secured.

Having described my invention, what I claim as new and desire to secure by Letters Patent is:

1. Apparatus of the kind described, comprising an electric motor, a motor base, and means for holding said motor substantially immovable and also insulated as to magnetically induced vibration from said base, said means consisting in a plurality of non-metallic strips of vibration dampening and absorbing material adapted to deaden magnetically induced vibrations connected to said motor and to said base, said strips engaging the motor at opposite sides thereof and being held under tension as the motor is supported thereby.

2. Apparatus of the kind described, comprising an electric motor, a motor base, and means for holding said motor spaced away from said base, substantially immovable, and insulated as to magnetically induced vibration therefrom, said means consisting in a plurality of strips of vibration absorbing material secured at their outer ends to said base at opposite sides of said motor and extending in toward one another with their inner ends fixed to the motor to support it, the motor being held substantially immovable by said strips and in turn holding them under tension as it is supported thereby.

3. Apparatus of the kind described, comprising an electric motor, a motor base, and means for holding the motor substantially immovable with respect to the base, in spaced apart relation thereto and insulated as to magnetically induced vibration therefrom, said means consisting in a pair of flexible rubber-like strips connected to said base at opposite sides of the motor and extending inward engaging the motor at their inner ends, said strips being held under tension as the motor is supported thereby.

4. Apparatus of the kind described, comprising a motor base having a pair of oppositely arranged flexible vibration absorbing strips fixed thereto at one end, and a motor fixed at either side to the other ends of said strips to be held immovably suspended thereby in spaced apart relation to the base and to hold said strips under tension.

5. Apparatus of the kind described, comprising a motor stand, a motor, and vibration absorbing means for holding the motor in spaced apart relation to the stand, said means being arranged to be placed under tension by its motor holding action and to hold said motor substantially immovable.

In testimony whereof, I have signed my name to this specification, in the presence of two subscribing witnesses.

JAMES G. RIMMER.

Witnesses:
 HARRISON C. HUMPHREY,
 CLYDE L. ROGERS.